US012108204B2

(12) United States Patent
Grossman et al.

(10) Patent No.: US 12,108,204 B2

(45) Date of Patent: Oct. 1, 2024

(54) ACOUSTIC SENSOR ASSEMBLY HAVING IMPROVED FREQUENCY RESPONSE

(71) Applicant: Knowles Electronics, LLC, Itasca, IL (US)

(72) Inventors: Alexander Grossman, Schaumburg, IL (US); Janice LoPresti, Itasca, IL (US); Usha Murthy, Itasca, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 152 days.

(21) Appl. No.: 17/566,129

(22) Filed: Dec. 30, 2021

(65) Prior Publication Data

US 2023/0217154 A1 Jul. 6, 2023

(51) Int. Cl.

*H04R 1/28* (2006.01)
*H04R 1/04* (2006.01)
*H04R 19/04* (2006.01)

(52) U.S. Cl.

CPC ............. *H04R 1/2823* (2013.01); *H04R 1/04* (2013.01); *H04R 19/04* (2013.01); *H04R 2201/003* (2013.01)

(58) Field of Classification Search

CPC .......... H04R 1/2823; H04R 1/04; H04R 1/08; H04R 1/083; H04R 1/222; H04R 1/326; H04R 19/04; H04R 19/016; H04R 19/01; H04R 2201/003; H04R 17/02; H04R 17/025; H04R 21/02

USPC ................................ 381/113, 114, 360, 369

See application file for complete search history.

(56) References Cited

U.S. PATENT DOCUMENTS

| | | | |
|---|---|---|---|
| 3,588,383 | A | 6/1971 | Carlson et al. |
| 4,272,654 | A | 6/1981 | Carlson |
| 5,647,013 | A | 7/1997 | Salvage et al. |
| 6,041,131 | A | 3/2000 | Kirchhoefer et al. |
| 6,658,134 | B1 | 12/2003 | Hal et al. |
| 7,103,196 | B2 | 9/2006 | Warren |
| 7,203,334 | B2 | 4/2007 | Schafer et al. |
| 7,236,609 | B1 | 6/2007 | Tsangaris et al. |
| 7,302,748 | B2 | 12/2007 | Jiles et al. |
| 7,336,797 | B2 | 2/2008 | Thompson et al. |
| 7,860,264 | B2 | 12/2010 | Jiles et al. |
| 7,995,789 | B2 | 8/2011 | Tsangaris et al. |

(Continued)

FOREIGN PATENT DOCUMENTS

| | | |
|---|---|---|
| CN | 203840067 U | 9/2014 |
| CN | 203840177 U | 9/2014 |

(Continued)

*Primary Examiner* — Ahmad F. Matar
*Assistant Examiner* — Sabrina Diaz

(57) ABSTRACT

An acoustic sensor assembly includes a housing having an external-device interface and a sound port to an interior of the housing. An electro-acoustic transducer and an electrical circuit are disposed within the housing. The electro-acoustic transducer separates the interior into a front volume and a back volume, where the sound port acoustically couples the front volume to an exterior of the housing. The back volume includes a first portion and a second portion. The electrical circuit is electrically coupled to the electro-acoustic transducer and to the external-device interface. One or more apertures acoustically couple the first and second portions of the back volume and are structured to shape a frequency response of the acoustic sensor assembly.

20 Claims, 8 Drawing Sheets

(56) References Cited

U.S. PATENT DOCUMENTS

| | | | |
|---|---|---|---|
| 8,018,049 | B2 | 9/2011 | Minervini |
| 8,624,385 | B1 | 1/2014 | Minervini |
| 8,624,387 | B1 | 1/2014 | Minervini |
| 8,629,552 | B1 | 1/2014 | Minervini |
| 8,704,360 | B1 | 4/2014 | Minervini |
| 8,879,767 | B2 | 11/2014 | Wickstrom |
| 9,006,880 | B1 | 4/2015 | Minervini |
| 9,023,689 | B1 | 5/2015 | Minervini |
| 9,137,605 | B2 | 9/2015 | Manley et al. |
| 9,139,421 | B1 | 9/2015 | Minervini |
| 9,148,731 | B1 | 9/2015 | Minervini |
| 9,485,585 | B2 | 11/2016 | McCratic et al. |
| 9,571,941 | B2 | 2/2017 | Heidenreich et al. |
| 9,781,505 | B2 | 10/2017 | Szczech et al. |
| 10,375,462 | B2 | 8/2019 | Liu et al. |
| 2007/0036378 | A1 | 2/2007 | Saltykov et al. |
| 2007/0201715 | A1 | 8/2007 | Minervini |
| 2013/0156235 | A1 | 6/2013 | Wickstrom |
| 2013/0279732 | A1 | 10/2013 | Sanecki et al. |
| 2013/0284537 | A1 | 10/2013 | LoPresti et al. |
| 2015/0201293 | A1 | 7/2015 | Sanecki et al. |
| 2015/0373456 | A1 | 12/2015 | Dayton et al. |
| 2016/0205463 | A1 | 7/2016 | Szczech et al. |
| 2018/0041838 | A1 | 2/2018 | Chang et al. |
| 2019/0069091 | A1 | 2/2019 | Bruins et al. |
| 2019/0208326 | A1 | 7/2019 | Scheleski et al. |
| 2019/0342666 | A1 | 11/2019 | Dayton et al. |
| 2019/0377321 | A1 | 12/2019 | Azuma et al. |
| 2019/0387321 | A1 | 12/2019 | Dayton et al. |
| 2021/0204056 | A1 | 7/2021 | Bradt et al. |
| 2021/0400366 | A1 | 12/2021 | LoPresti et al. |
| 2022/0210576 | A1 | 6/2022 | Monti et al. |
| 2023/0045906 | A1* | 2/2023 | Zhou ........................ H04R 1/08 |
| 2023/0114156 | A1* | 4/2023 | Do ....................... H04R 1/2896 381/113 |
| 2023/0207173 | A1 | 6/2023 | King et al. |

FOREIGN PATENT DOCUMENTS

| | | | |
|---|---|---|---|
| CN | 203840180 | U | 9/2014 |
| CN | 203951282 | U | 11/2014 |
| CN | 203951286 | U | 11/2014 |
| CN | 204046390 | U | 12/2014 |
| CN | 204046391 | U | 12/2014 |
| CN | 204291354 | U | 4/2015 |
| CN | 204350282 | U | 5/2015 |
| CN | 204350283 | U | 5/2015 |
| CN | 204350285 | U | 5/2015 |
| CN | 204350286 | U | 5/2015 |
| CN | 205584474 | U | 9/2016 |
| CN | 205595924 | U | 9/2016 |
| CN | 205595999 | U | 9/2016 |
| CN | 205830004 | U | 12/2016 |
| CN | 206879077 | U | 1/2018 |
| CN | 214070149 | U | 8/2021 |
| CN | 214429687 | U | 10/2021 |
| PH | 22021050264 | U1 | 7/2021 |
| PH | 22021050699 | | 3/2022 |
| VN | 29365 | A | 4/2012 |

* cited by examiner

ACOUSTIC SENSOR ASSEMBLY HAVING IMPROVED FREQUENCY RESPONSE

TECHNICAL FIELD

The present disclosure relates generally to acoustic sensor assemblies and more particularly to acoustic sensor assemblies, for example, microelectromechanical systems (MEMS) microphones, having an improved frequency response.

BACKGROUND

Microelectromechanical systems (MEMS) microphones are widely used in various devices including hearing aids, mobile phones, smart speakers, personal computers among other devices and equipment for their low cost, small size, high sensitivity, and high signal to noise ratio (SNR). A MEMS microphone generally comprises a MEMS motor and an integrated circuit disposed in a housing formed by a metal can or shielded cover mounted on a base configured for integration with a host device. The MEMS motor converts sound entering the housing via a port to an electrical signal conditioned by a downstream integrated circuit. The conditioned electrical signal is output on a host-device interface of the microphone for use by the host device. The performance of a microphone can be characterized by its sensitivity over a range of frequencies (referred to herein as a "frequency response"). Sensitivity is a ratio of an analog or digital output signal to a reference input sound pressure level (SPL), typically 1 Pascal at 1 kHz. However, the sensitivity of a microphone is not uniform across all frequencies of interest and may not meet an aspired performance specification.

The various aspects, features and advantages of the present disclosure will become more fully apparent to those having ordinary skill in the art upon consideration of the following Detailed Description and the accompanying drawings described below.

BRIEF DESCRIPTION OF THE DRAWINGS

The disclosure is described in more detail below in connection with the appended drawings and in which like reference numerals represent like components.

DETAILED DESCRIPTION

Figure 1:
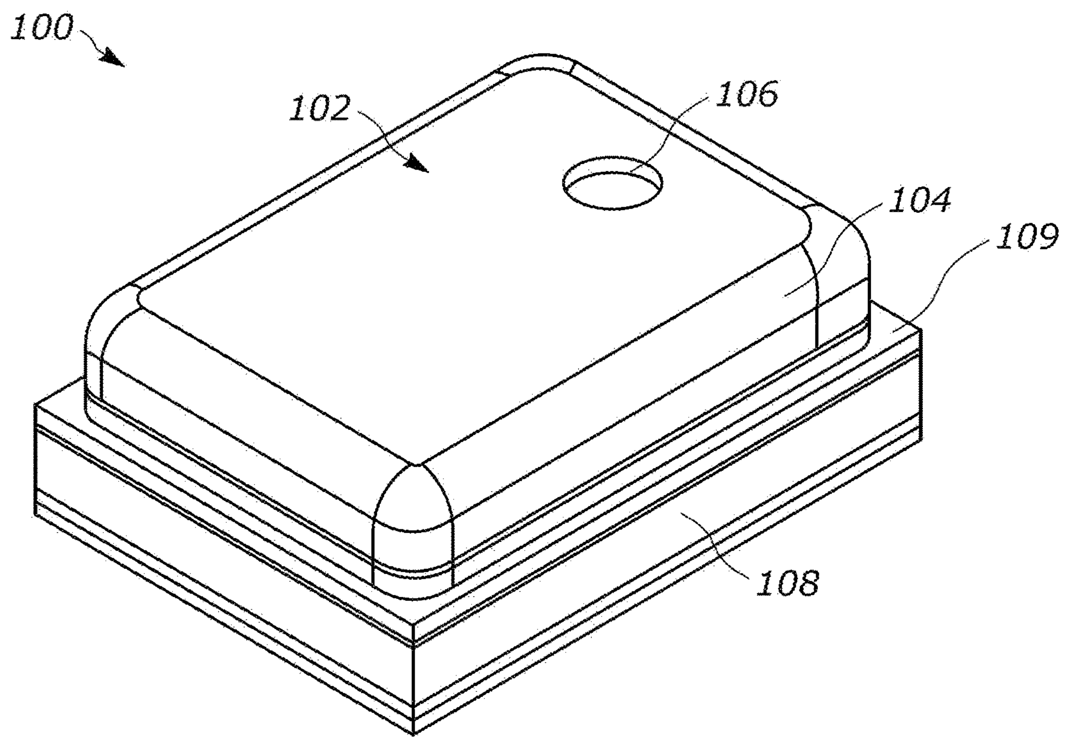
FIGS. 1-2 are perspective views of a microphone assembly with an enhanced back volume formed internally in the microphone assembly.

According to one aspect of the disclosure, an acoustic sensor assembly (e.g., a MEMS microphone assembly) comprises an electro-acoustic transducer (e.g., a MEMS motor) and an electrical circuit disposed within a housing. An electrical circuit is also disposed within the housing and electrically coupled to the electro-acoustic transducer and to electrical contacts on an external-device interface of the housing. The transducer separates the interior into a front volume and a back volume. A sound port acoustically couples the front volume to an exterior of the housing, and the back volume includes a first portion and a second portion. One or more apertures acoustically couple the first and second portions of the back volume and are structured to shape a frequency response of the acoustic sensor assembly. The acoustic sensor assembly can be implemented as a microphone or vibration sensor among other sensors and combinations thereof.

In some embodiments, the housing comprises a cover disposed on a surface of a base, the electro-acoustic transducer is mounted on the base, and the sound port is located on the cover. The first back volume portion is located between the cover and the base. The second back volume portion is located at least partially in the base. In one implementation, a portion of the second back volume is located in the base. In another implementation, the entire second back volume portion is located in the base. The one or more apertures are disposed partially or fully through a portion of the base that separates the first and second portions of the back volume, depending on whether the second back volume portion is fully or partially located in the base. In certain embodiments, a second cover is disposed on a surface of the base opposite the cover, wherein the one or more apertures extend fully through the base and at least a portion of the back volume is located in the second cover. In the various acoustic sensor assemblies described herein, the one or more apertures can be a part of a screen or other damping member separating the first and second portions of the back volume. For example, the screen can be disposed over an aperture in the base connecting to the back volume. The screen separates the first and second portions of the back volume. Alternatively, the one or more apertures can be one or more openings partially or fully through the base without a screen or other damping member.

In various embodiments, characteristics of the one or more apertures between the first and second portions of the back volume shape the frequency response of the acoustic sensor assembly. These characteristics include acoustic impedance, e.g., resistance, inertance, or compliance or any combination thereof. The frequency response can be characterized by a plot of sensor sensitivity versus frequency. The one or more apertures between the first and second portions of the back volume can be structured to increase or decrease sensitivity of the sensor at certain frequencies.

Figure 2:
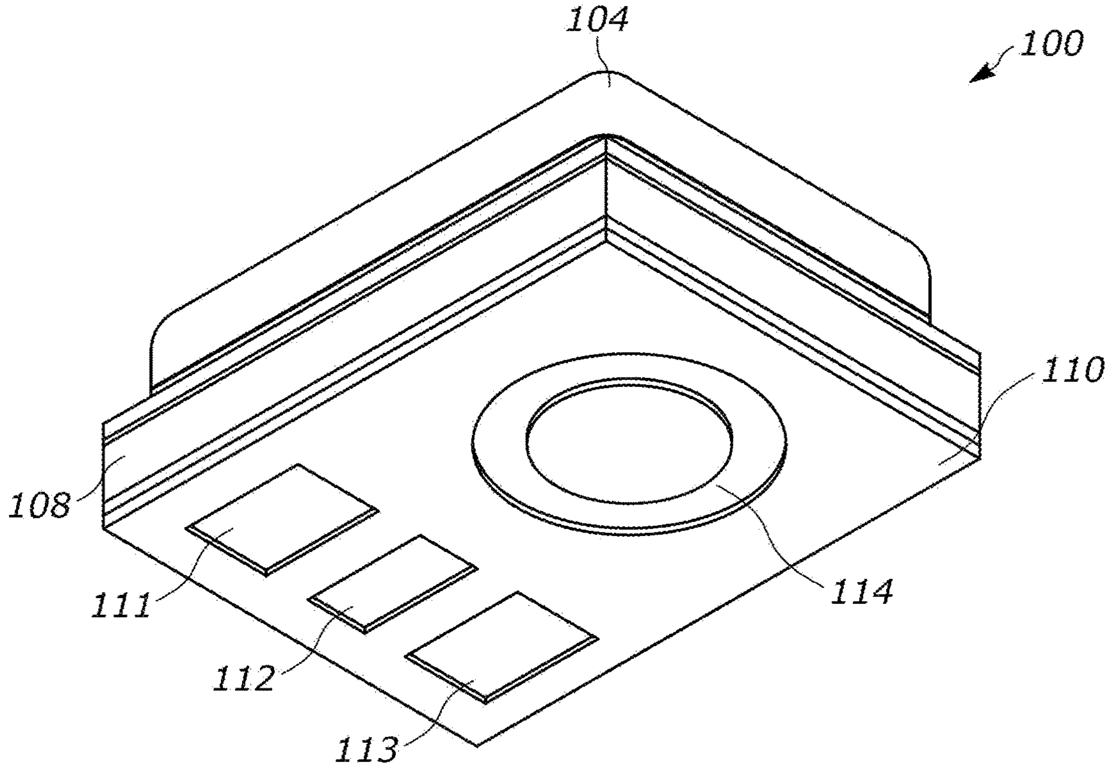
Figure 4:
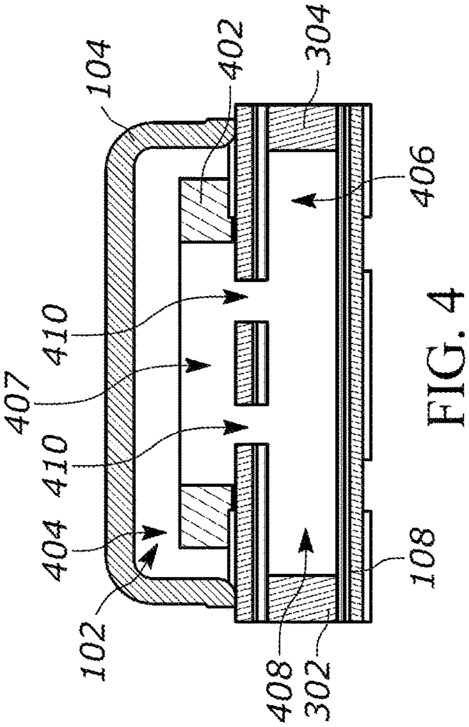
FIGS. 4-5 are cross-sectional views along lines A-A and B-B, respectively, of the microphone assembly of FIG. 3.
Figure 5:
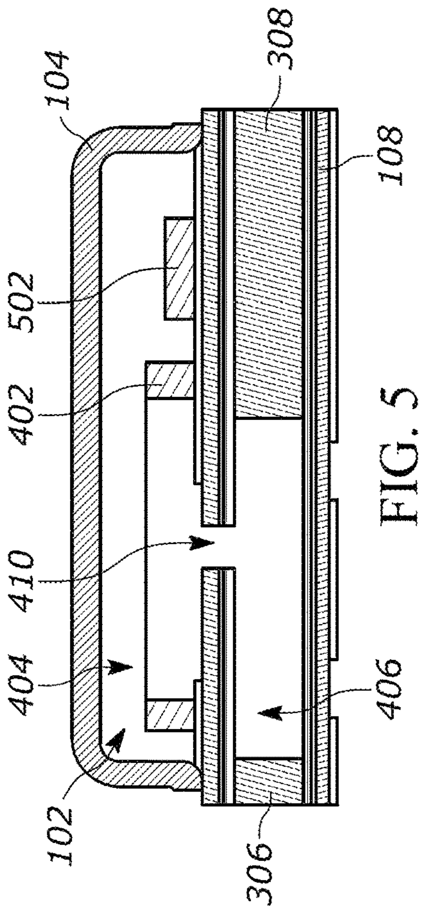

FIGS. 1 and 2 show perspective views of an acoustic sensor assembly 100 comprising a housing 102 having a lid or cover 104 mounted on a base 108. The cover includes a sound port 106 through which sound can enter the housing. The cover can be configured to shield the interior of the housing from electromagnetic interference. The base includes a top surface 109 (on which the cover is mounted) and a bottom surface 110 (shown only in FIG. 2). The bottom surface includes an external-device interface with electrical contacts 111-113 (e.g., supply voltage, ground, clock, data, etc.). In FIG. 2, the ground plane is shown as a ring-shaped contact 114. In other embodiments, the ground contact has a different shape. In one implementation, the external-device interface is a surface-mount interface suitable for integrating the sensor assembly to a host device, for example by reflow or wave soldering or some other known or future surface-mount technology. Alternatively, the sensor assembly can include through-hole pins for integration with the host. The microphone assembly of FIG. 1 shows a top port device with the sound port on the cover.

Figure 3:
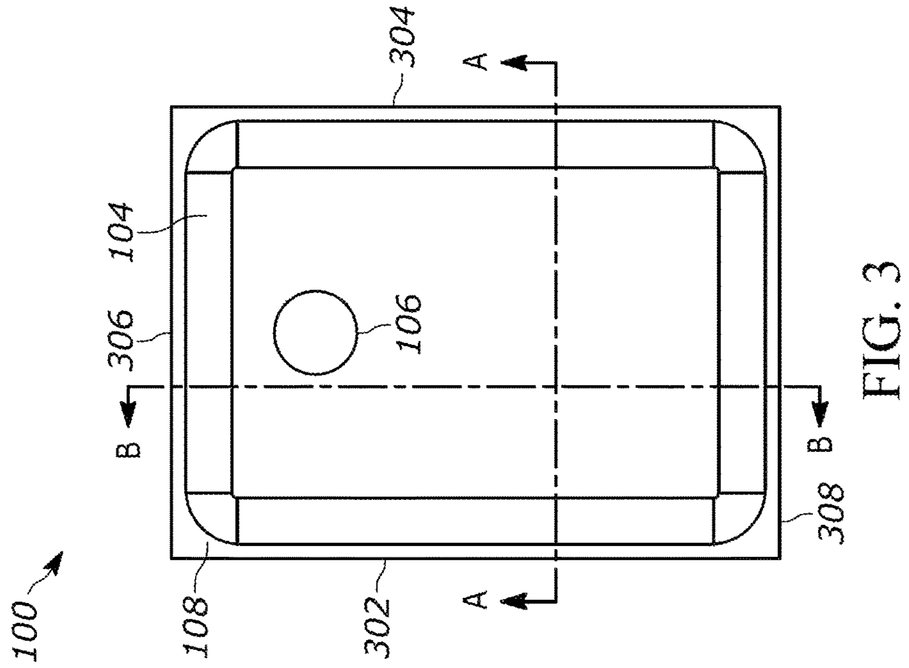
FIG. 3 is a top view of the microphone assembly of FIG. 1 with a first implementation of the enhanced back volume.
Figure 7:
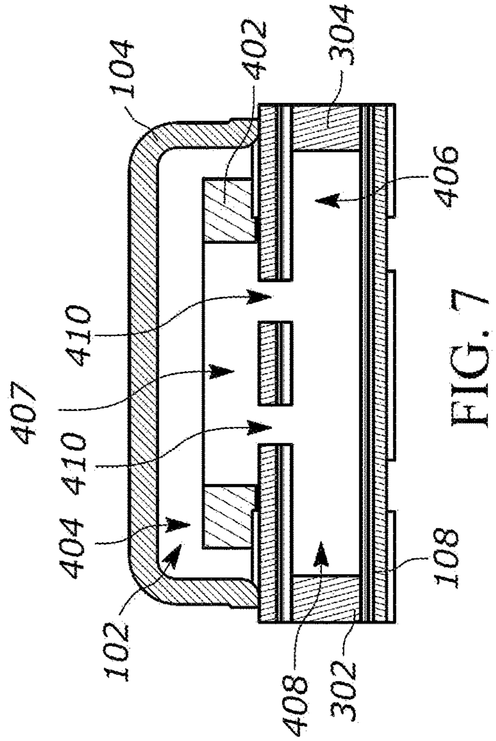
FIGS. 7-8 are cross-sectional views along lines C-C and D-D, respectively, of the microphone assembly of FIG. 6.
Figure 8:
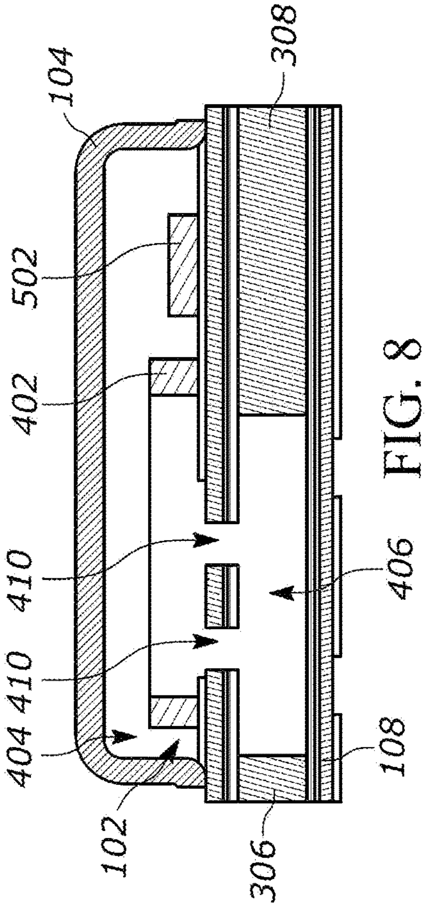
Figure 6:
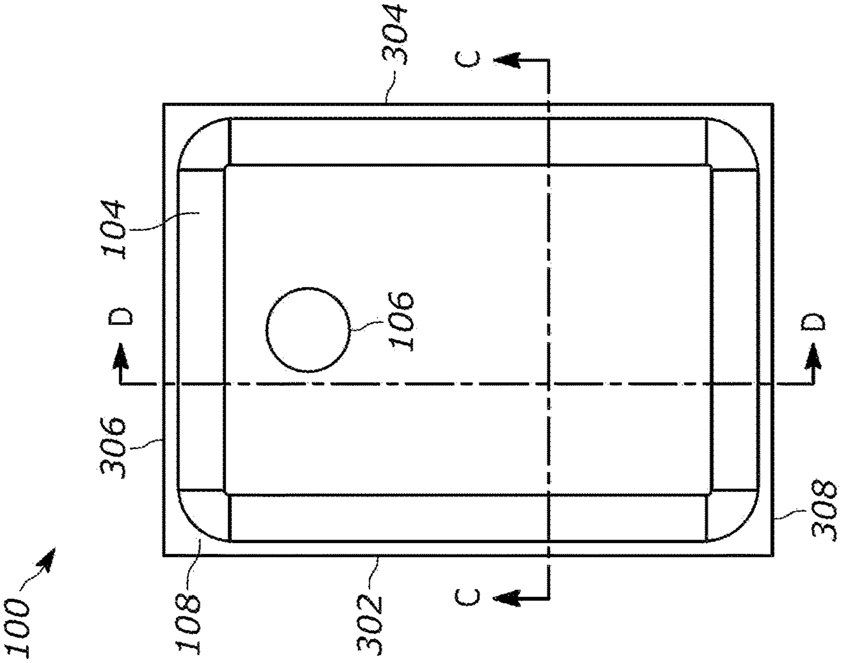
FIG. 6 is a top view of the microphone assembly of FIG. 1 with a second implementation of the enhanced back volume.
Figure 10:
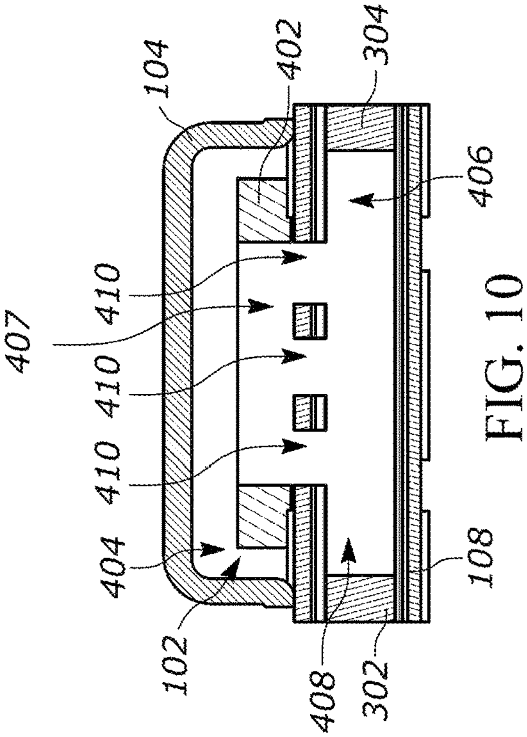
FIGS. 10-11 are cross-sectional views of along lines E-E and F-F, respectively, of the microphone assembly of FIG. 9.
Figure 11:
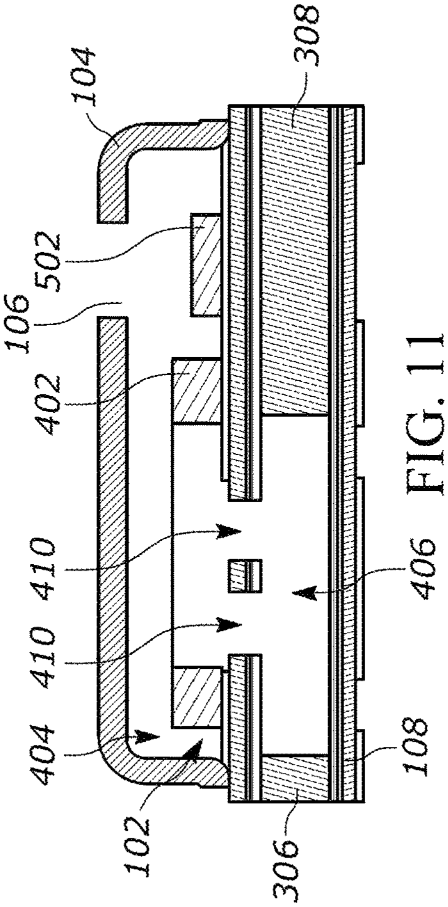
Figure 9:
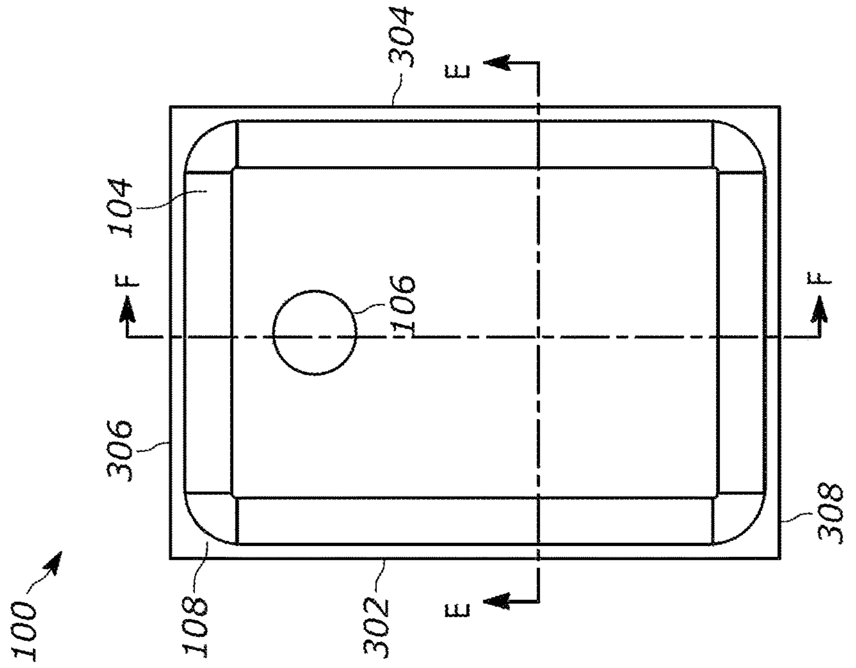
FIG. 9 is a top view of the microphone assembly of FIG. 1 with a third implementation of the enhanced back volume.

In one implementation, generally, a top port sensor assembly comprises an enhanced back volume formed internally in the sensor assembly. The back volume is configured to shape the frequency response of the sensor assembly as described further herein. In FIGS. 3, 6 and 9, the base includes sidewalls 302, 304 and end walls 306, 308. In FIGS. 4, 5, 7, 8, 10 and 11, an electro-acoustic transducer 402 and an electrical circuit 502 (e.g., an integrated circuit) are disposed in an interior of the housing. The electrical circuit is electrically coupled to the electro-acoustic transducer and to the electrical contacts on the external-device interface. The electro-acoustic transducer can be any suitable type including a capacitive, piezoelectric, or optical transduction device among others implemented with electret materials, microelectromechanical systems (MEMS) technology or other known or future technology. The electro-acoustic transducer is configured to convert sound into an electrical signal. Once converted, the electrical circuit conditions the electrical signal before providing the conditioned signal at the external-device interface. Such conditioning may include buffering, amplification, filtering, analog-to-digital (A/D) conversion for digital devices, and signal protocol formatting among other conditioning or processing.

Generally, the electro-acoustic transducer separates the interior of the housing into a front volume and a back volume. The sound port acoustically couples the front volume to an exterior of the housing. The back volume comprises a first back volume portion acoustically coupled to a second back volume portion by one or more apertures, wherein the aperture is structured to shape a frequency response of the sensor.

Figure 16:
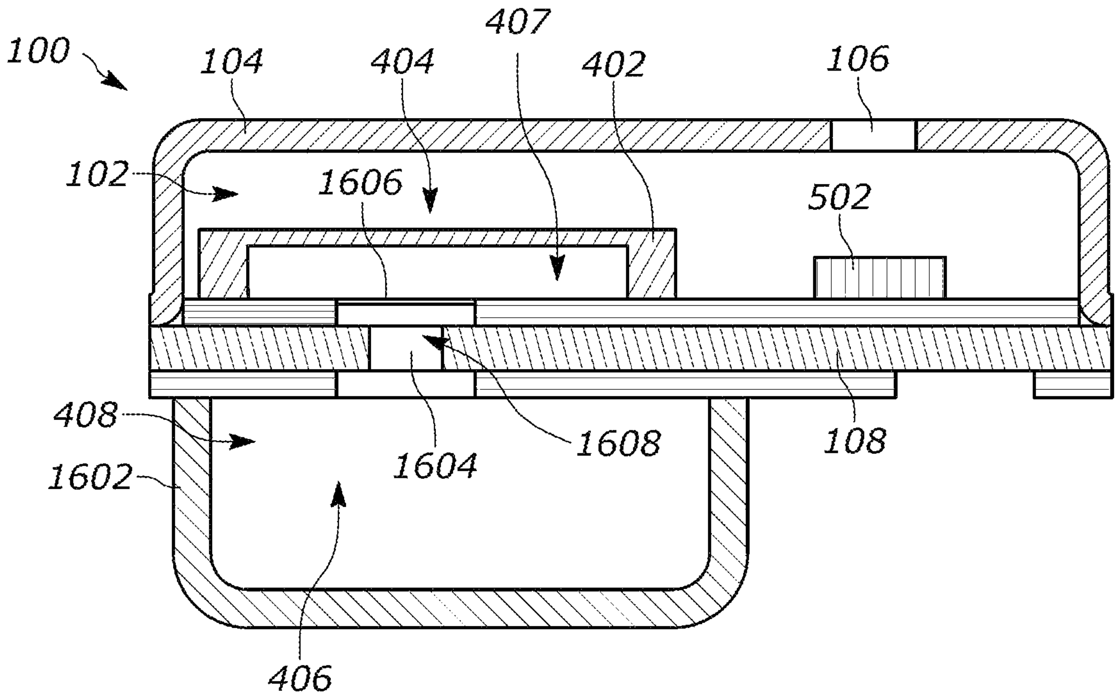
FIG. 16 is a cross-sectional view of a microphone assembly with an enhanced back volume formed externally in the microphone assembly.
Figure 17:
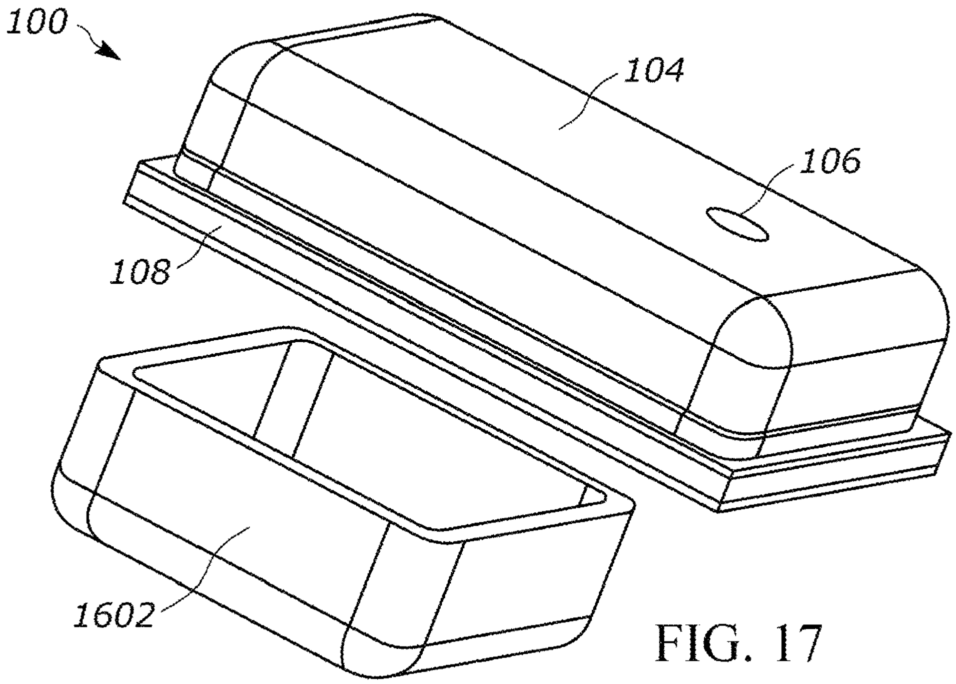
FIGS. 17-18 are exploded perspective views of the microphone assembly of FIG. 16.

In FIGS. 4, 5, 7, 8, 10 and 11, the electro-acoustic transducer separates the interior of the housing into a front volume 404 and a back volume 406. The sound port acoustically couples the front volume to an exterior of the housing. The back volume includes a first portion 407 and a second portion 408. The first portion of the back volume is located at least partially between the electro-acoustic transducer and the base. The second portion of the back volume is located entirely in the base and defined in part by the sidewalls and the end walls of the base. In FIGS. 4, 5, 7, 8, 10 and 11, the second portion of the back volume 408 is a cavity fully formed in the base. In FIGS. 16 and 17, the second portion of the back volume is a cavity fully partially in the base. The portion of the back volume located in the based can be formed by drilling, milling, or molding, among other fabrication techniques.

Figure 14:
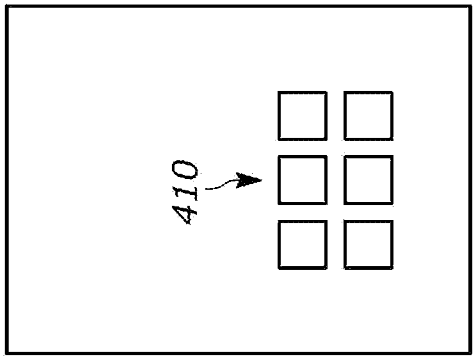
FIGS. 12-14 are different aperture configurations for an enhanced back volume.
Figure 13:
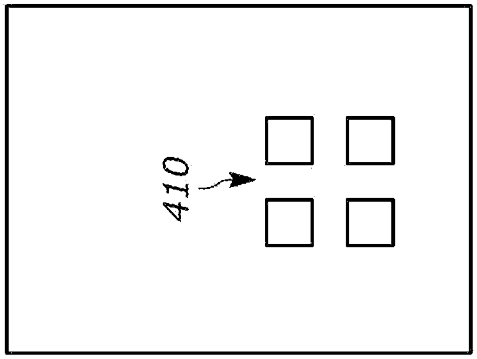
Figure 12:
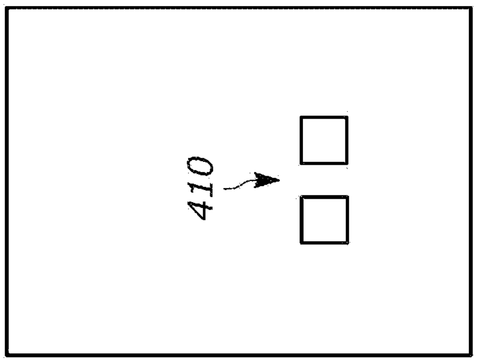

In FIGS. 4, 5, 7, 8, 10 and 11, one or more apertures 410 acoustically connect the first and second portions of the back volume. FIGS. 12-14 show multiple apertures having different configurations. In FIG. 12, the configuration includes two arrayed apertures corresponding to the plurality of apertures of FIGS. 3-5. In FIG. 13, the configuration includes four arrayed apertures corresponding to the plurality of apertures used in FIGS. 6-8. In FIG. 13, the configuration includes six arrayed apertures corresponding to the plurality of apertures used in FIGS. 9-11. Alternatively, a single aperture can connect the first and second portions of the back volume.

Figure 18:
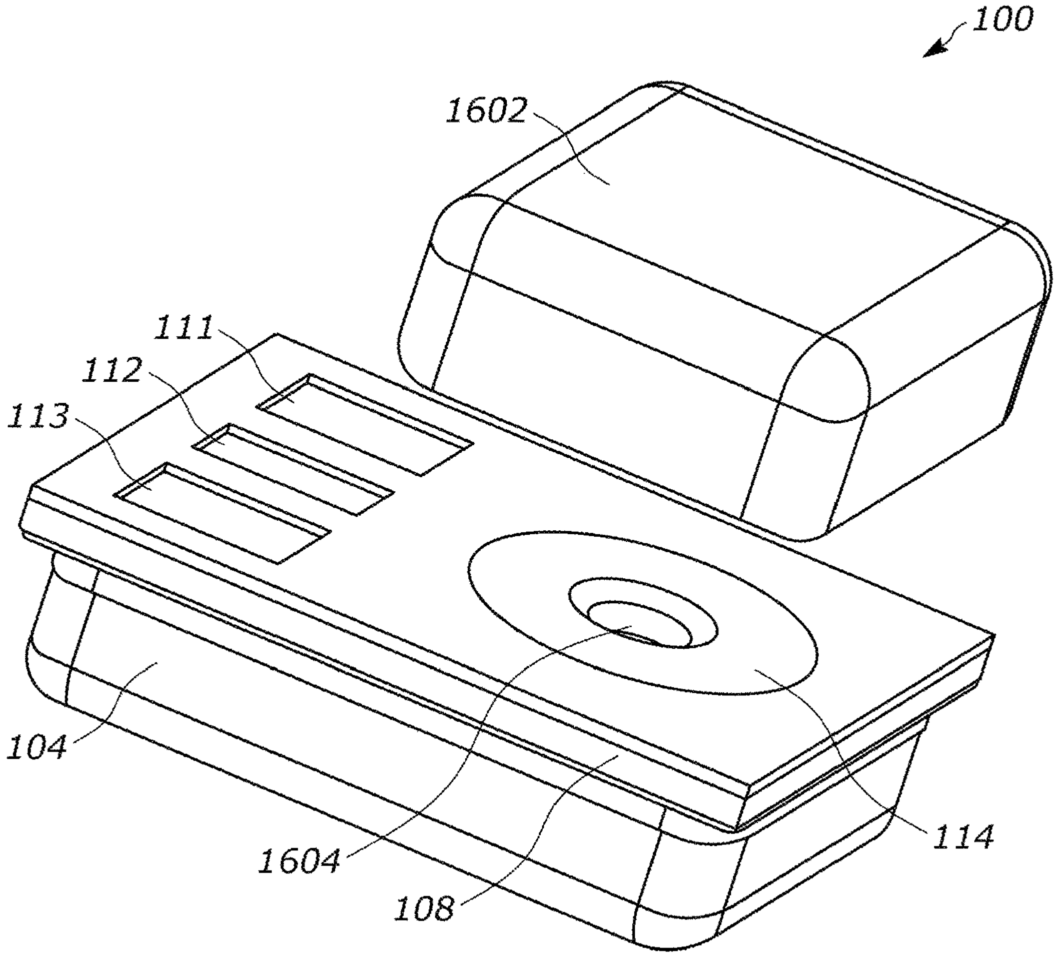

FIGS. 16-18 illustrate another embodiment of a sensor assembly 100 wherein a portion of the back volume is formed by a second cover 1602 fastened to a portion of the base 108 opposite the cover 104. In this manner, the enclosed volume created by the second cover constitutes a portion of the second portion of the back volume. One or more vents 1604 extending through the base acoustically connect the first and second portions of the back volume. The one or more apertures can be part of a screen, mesh or other panel 1606 disposed over a portion 1608 of the one or vents.

The acoustic performance of the sensor assembly can be shaped or modified by structurally configuring the one or more apertures coupling the first and second portions of the back volume. For example, an acoustic impedance of the one or more apertures can be configured by selectively sizing an aperture between the first and second portions of the back volume. Alternatively, the acoustic impedance can be configured by increasing or decreasing the number of apertures between the first and second portions of the back volume. The acoustic impedance can also be configured by impeding or enhancing the propagation of sound through the one or more apertures via introduction or removal of a mechanical obstruction medium (e.g., a screen, barrier, etc.) in or over the one or more apertures.

Figure 15:
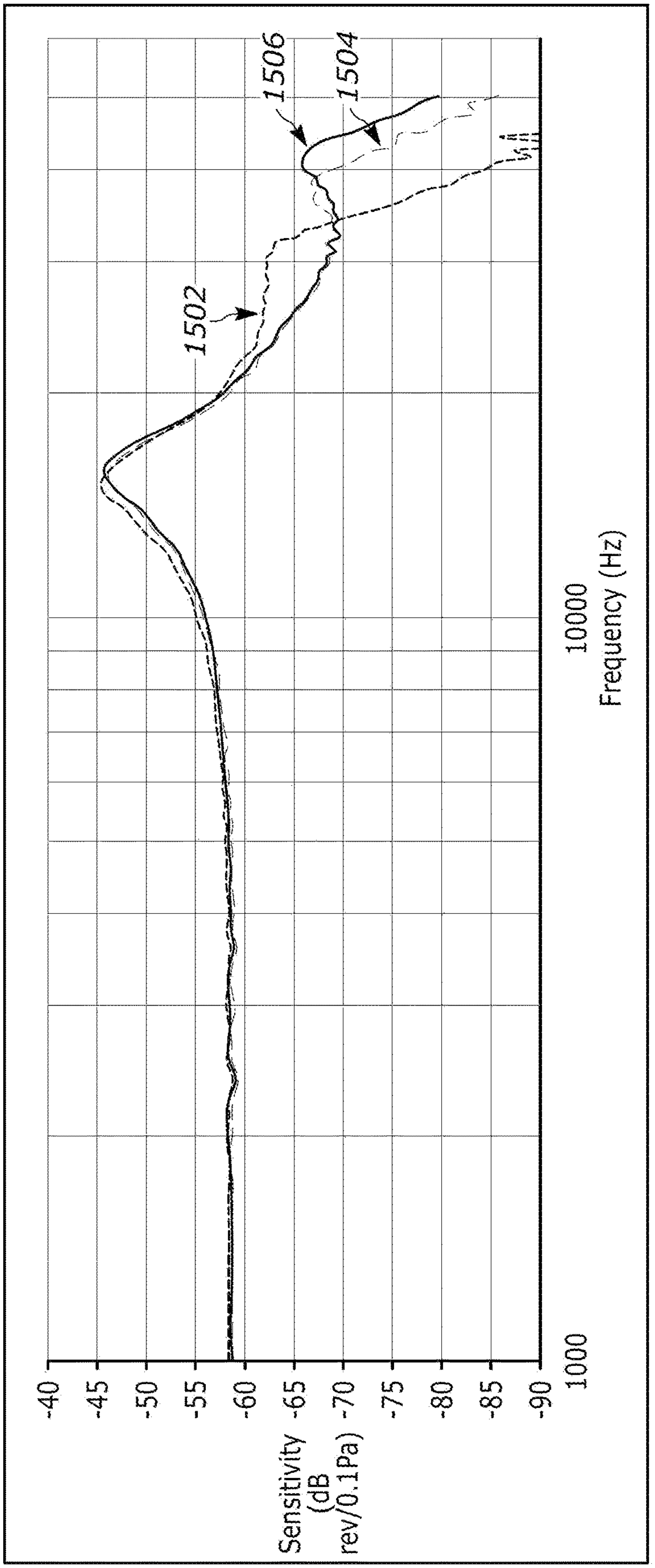
FIG. 15 is a graph of frequency responses for different aperture configurations.

Generally, lower acoustic impedance of the one or more apertures between the first and second portions of the back volume increases sensor sensitivity at higher frequencies and vice-versa. In one implementation, the one or more apertures are structured to increase sensitivity at frequencies above 11 kHz. FIG. 15 shows the frequency responses for different configurations of the one or more apertures connecting the first and second portions of the back volume. Plot 1502 corresponds to the frequency response of a sensor assembly having the two-aperture array configuration of FIG. 12. Plot 1504 corresponds to the frequency response of a sensor assembly having the four-aperture array configuration of FIG. 13. Plot 1506 corresponds to the frequency response of a sensor assembly having the six-aperture array of FIG. 14. The four-aperture array has less acoustic impedance than the two-aperture array. Similarly, the six-aperture array has less acoustic impedance than the four-aperture array. In FIG. 16, plot 1504 shows that the sensor assembly having the four-aperture array has greater sensitivity at higher frequencies than the sensor assembly having a two-aperture array acoustically coupling the first and second portions of the back volume. Plot 1506 shows that the sensor assembly having the six-aperture array has greater sensitivity at higher frequencies than the sensor assembly with the four-aperture array. Alternatively, the increase in sensitivity can be obtained by reducing the acoustic impedance of a single aperture between the first and second portions of the back volume. Conversely, sensitivity at higher frequencies of the frequency response can be reduced by increasing the acoustic impedance of one or more aperture between the first and second portions of the back volume.

Among other advantages, employing a plurality of apertures to enhance the back volume of a microphone or another sensor can serve to create more desirable frequency responses in the microphone. Other benefits will be recognized by those of ordinary skill in the art.

While the present disclosure and what is presently considered to be the best mode thereof has been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the appended claims.

The invention claimed is:

1. An acoustic sensor assembly comprising:

a housing having an external-device interface and a sound port to an interior of the housing;

an electro-acoustic transducer disposed in the interior of the housing and separating the interior of the housing into a front volume and a back volume, the sound port acoustically coupling the front volume to an exterior of the housing, and the back volume comprising a first portion and a second portion;

an electrical circuit in the interior of the housing and electrically coupled to the electro-acoustic transducer and to electrical contacts on the external-device interface; and a plurality of apertures acoustically coupling the first portion of the back volume and the second portion of the back volume, wherein the plurality of apertures are arranged to shape a frequency response of the acoustic sensor assembly.

2. The acoustic sensor assembly of claim 1, wherein the housing comprises a cover disposed on a surface of a base, the electro-acoustic transducer mounted on the base, the sound port is located on the cover, and the plurality of apertures are disposed at least partially through the base.

3. The acoustic sensor assembly of claim 2, wherein the plurality of apertures are part of a screen separating the first portion of the back volume from the second portion of the back volume.

4. The acoustic sensor assembly of claim 2, wherein the first portion of the back volume is located between the cover and the base and the second portion of the back volume is at least partially formed in the base.

5. The acoustic sensor assembly of claim 4, wherein the second portion of the back volume is fully formed in the base and the plurality of apertures are formed in a portion of the base separating the first portion of the back volume from the second portion of the back volume.

6. The acoustic sensor assembly of claim 4, further comprising a second cover disposed on a surface of the base opposite the cover, the second cover comprising at least a portion of the second portion of the back volume.

7. The acoustic sensor assembly of claim 1, wherein the shape of the frequency response is based on a characteristic of the plurality of apertures.

8. The acoustic sensor assembly of claim 7, wherein the shape of the frequency response is characterized by sensor sensitivity versus frequency and the apertures between the first portion of the back volume and the second portion of the back volume are structured to increase sensitivity at frequencies above 11 kHz.

9. The acoustic sensor assembly of claim 7, wherein the shape of the frequency response is characterized by sensor sensitivity versus frequency, and the plurality of apertures are located in a common plane.

10. A microelectromechanical systems (MEMS) microphone assembly comprising:

a housing having an external-device interface and a sound port to an interior of the housing;

a MEMS motor disposed in the interior of the housing and separating the interior of the housing into a front volume and a back volume, the sound port acoustically coupling the front volume to an exterior of the housing, and the back volume comprising a first back volume portion and a second back volume portion;

an integrated circuit disposed in the interior of the housing and electrically coupled to the MEMS motor and to electrical contacts on the external-device interface; and a plurality of apertures acoustically coupling the first back volume portion to the second back volume portion, wherein the plurality of apertures shape a frequency response of the MEMS microphone assembly.

11. The MEMS microphone assembly of claim 10, wherein the housing comprises a cover disposed on a surface of a base, the MEMS motor is mounted on the base, the sound port is located on the cover, and the plurality of apertures are disposed at least partially through the base.

12. The MEMS microphone assembly of claim 11, wherein the plurality of apertures are part of a screen separating the first back volume portion from the second back volume portion.

13. The MEMS microphone assembly of claim 11, wherein the first back volume portion is located between the cover and the base and the second back volume portion is at least partially formed in the base.

14. The MEMS microphone assembly of claim 13, wherein the second back volume portion is fully formed in the base and the plurality of apertures are formed in a portion of the base separating the first back volume portion from the second back volume portion.

15. The MEMS microphone assembly of claim 13, further comprising a second cover disposed on a surface of the base opposite the cover, the second cover comprising at least a portion of the second back volume portion.

16. The MEMS microphone assembly of claim 10, wherein the shape of the frequency response is based on a characteristic of the plurality of apertures.

17. The MEMS microphone assembly of claim 16, wherein the shape of the frequency response is characterized by microphone sensitivity versus frequency and the apertures between the first back volume portion and the second back volume portion are structured to increase sensitivity at frequencies above 11 kHz.

18. The MEMS microphone assembly of claim 10, wherein the plurality of apertures are located in a common plane.

19. The MEMS microphone assembly of claim 18, wherein the housing comprises a cover disposed on a surface of a base, the MEMS motor is mounted on the base, the sound port is located on the cover, and the plurality of apertures are disposed at least partially through the base.

20. The MEMS microphone assembly of claim 19, wherein the plurality of apertures are part of a screen separating the first back volume portion from the second back volume portion.

* * * * *